(12) United States Patent
Huscroft et al.

(10) Patent No.: US 9,317,666 B2
(45) Date of Patent: Apr. 19, 2016

(54) LICENSE MANAGEMENT OF FIRMWARE-CONTROLLABLE FEATURES IN COMPUTER SYSTEMS

(75) Inventors: Carey Huscroft, Davis, CA (US); Steven B Lyle, Granite Bay, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/386,792

(22) PCT Filed: Mar. 30, 2012

(86) PCT No.: PCT/US2012/031603
§ 371 (c)(1),
(2), (4) Date: Sep. 19, 2014

(87) PCT Pub. No.: WO2013/147870
PCT Pub. Date: Oct. 3, 2013

(65) Prior Publication Data
US 2015/0074815 A1    Mar. 12, 2015

(51) Int. Cl.
*G06F 7/04* (2006.01)
*G06F 21/10* (2013.01)
*G06F 21/12* (2013.01)
*G06F 21/62* (2013.01)
*G06F 13/38* (2006.01)
*G06F 21/57* (2013.01)
*G06F 13/14* (2006.01)

(52) U.S. Cl.
CPC ............ *G06F 21/105* (2013.01); *G06F 13/385* (2013.01); *G06F 21/12* (2013.01); *G06F 21/629* (2013.01); *G06F 13/14* (2013.01); *G06F 21/572* (2013.01)

(58) Field of Classification Search
CPC ..... G06F 21/105; G06F 13/14; G06F 21/121; G06F 21/629; G06F 21/572
See application file for complete search history.

(56) References Cited

U.S. PATENT DOCUMENTS

| 7,752,140 | B1 | 7/2010 | Xu et al. |
| 2003/0191961 | A1 | 10/2003 | Zunke |
| 2004/0059926 | A1 | 3/2004 | Angelo et al. |
| 2008/0243862 | A1* | 10/2008 | Pathak et al. ................... 707/10 |
| 2008/0271122 | A1 | 10/2008 | Nolan et al. |
| 2009/0094597 | A1* | 4/2009 | Moskalik et al. ............. 717/174 |

(Continued)

OTHER PUBLICATIONS

ISA/KR, International Search Report, mailed Oct. 29, 2012, PCT/US2012/031603.

(Continued)

*Primary Examiner* — Techane Gergiso
(74) *Attorney, Agent, or Firm* — Hewlett Packard Enterprise Patent Department

(57) ABSTRACT

License management of firmware-controllable features in computer systems is described. In an example, a computer system includes: a plurality of hardware modules having a plurality of features capable of selective activation; firmware-based controllers distributed among the plurality of hardware modules having control points to control activation of the plurality of features; and a management module to obtain license data and communicate with the firmware-based controllers to configure the control points to activate at least one of the plurality of features as permitted by the license data.

12 Claims, 4 Drawing Sheets

(56) References Cited

U.S. PATENT DOCUMENTS

| | | |
|---|---|---|
| 2009/0216548 A1 | 8/2009 | Balu et al. |
| 2010/0124235 A1 | 5/2010 | Walsh et al. |
| 2010/0293272 A1 | 11/2010 | Karunakaran et al. |
| 2011/0093371 A1 | 4/2011 | Clemm et al. |
| 2012/0072995 A1 | 3/2012 | Crawford |

OTHER PUBLICATIONS

"NetApp System Administration", retrieved from Internet Nov. 17, 2012: http://www.datadisk.co.uk/html_docs/netapp/netapp_admin.htm.

* cited by examiner

LICENSE MANAGEMENT OF FIRMWARE-CONTROLLABLE FEATURES IN COMPUTER SYSTEMS

BACKGROUND

Computer systems can include memory to store code executable to control various features. This code can be referred to as "firmware". The firmware can be store on various types of memory, such as non-volatile memory, hard disc storage, and the like. Computer systems can include one or more hardware elements that use firmware to control features ("firmware controllable features"). For example, a computer system, such as a desktop or workstation, can include system firmware with a basic input output system (BIOS) interface. The BIOS can control various features of the desktop computer. In contrast, an enterprise server system can include a chassis with several hardware modules, such as servers, network devices, etc., each having one or more hardware elements that use firmware to control features (e.g., system firmware, baseband management controller (BMC) firmware, etc.). Thus, some computer systems include distributed firmware across multiple hardware modules that control the features of the system. In some cases, which features can be activated in a computer system depends on what license or licenses the end-user has purchased for the computer system.

BRIEF DESCRIPTION OF THE DRAWINGS

Some embodiments of the invention are described with respect to the following figures.

DETAILED DESCRIPTION

License management of firmware-controllable features in computer systems is described. In an embodiment, a computer system includes a plurality of hardware modules having a plurality of features capable of selective activation. Firmware-based controllers distributed among the plurality of hardware modules have control points to control activation of the features. A management module obtains license data and communicates with the firmware-based controllers to configure the control points to activate one or more of the features as permitted by the license data.

Computer systems, such as enterprise server systems, often have value-add features that are enabled or controlled by firmware. The implementation or control of these features can be distributed across several different embedded processor systems. Without a centralized licensing structure, manufacturers have to provide several specialized products that support varying feature sets focused on specific customer segments. Providing several different versions of a computer system, however, has unintended side effects, including added supply chain management, increased development costs, and increased testing costs, all of which can erode profit margins.

Examples described herein combine feature control points in the firmware to enable or disable (activate or deactivate) features within a licensing structure. This allows a manufacturer to control which features are activated and collect revenue for such activation. Examples described herein provide fine-grained feature control that can scale to distributed firmware systems within an overall licensing structure. Such examples provide the ability to tie a license to a specific computer system (e.g., server), broadcast the capabilities within the product to all parts of the system (e.g., blades or modules in the server), set the pricing dependent on the size of the system, and let the customer retrieve, query, and manage licenses for various features. Embodiments of the invention can be understood with respect to the following example implementations.

Figure 1:
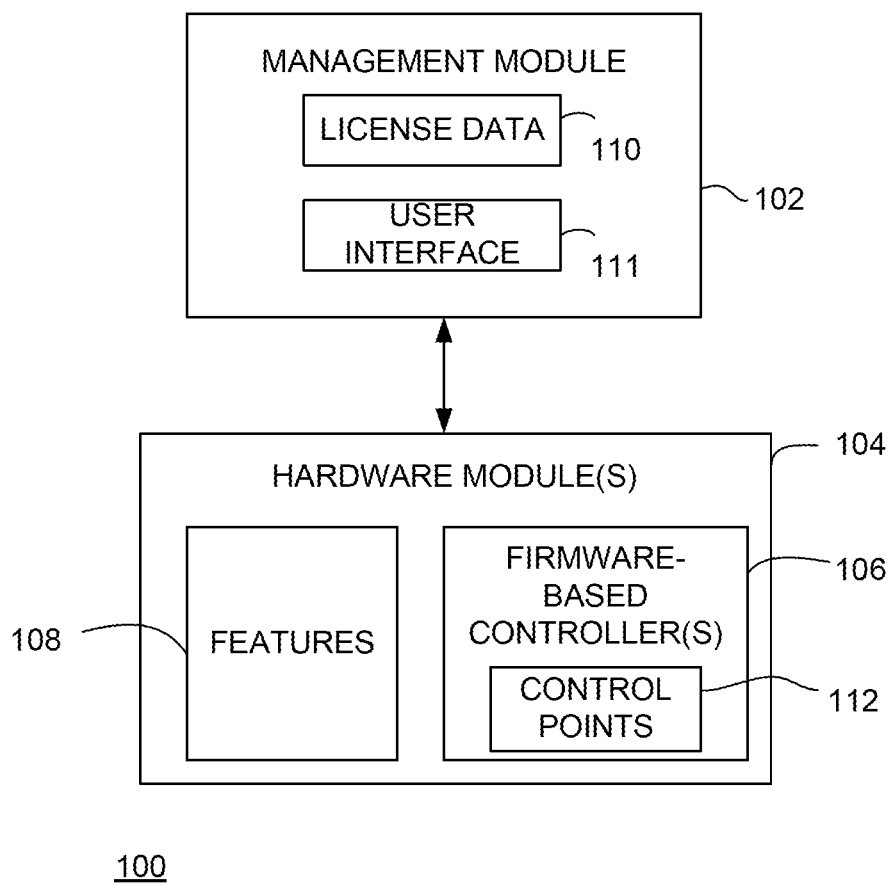
FIG. 1 is a block diagram depicting a computer system according to an example implementation.

FIG. 1 is a block diagram depicting a computer system 100 according to an example implementation. The computer system 100 includes a management module 102 and hardware module(s) 104. The hardware module(s) 104 include firmware-based controller(s) 106 and various features 108. The hardware module(s) 104 can include a computer device, peripheral device, or the like, such as servers, workstations, storage devices, network devices, and the like, as well as combinations of such devices. In an example, the computer system 100 can include a single hardware module 104 (e.g., a desktop or workstation computer). In another example, the computer system 100 can include multiple hardware modules 104 (e.g., a server computer). The hardware module(s) 104 can be configured to provide one or more of the features 108. The features 108 can include any of a myriad of functions of the hardware module(s) 104 that can be selected "on" or "off" (e.g., activated/deactivated). Some features can be provided by one of the hardware modules 104, while other features can be provided by a combination of multiple hardware modules 104. Example features 108 can include virtualization features, fault management features, self-healing high availability (HA) features, power management features, security features, remote access features, and the like.

The management module 102 can include a computer device that controls the hardware module(s) 104. The management module 102 can perform various functions with respect to the hardware module(s) 104, such as setup, configuration, activation/deactivation, monitoring, and the like. In an example, the management module 102 performs license management for the hardware module(s) 104. The management module 102 can obtain and maintain license data 110 that can be used to activate/deactivate the features 108. The management module 102 can provide a user interface 111 to users, such as a graphic user interface (GUI), command line interface (CLI), or the like. The user interface 111 can be used to query the management module 102 for current licenses, obtain new licenses, and apply licenses to activate features.

In an example, the license data 110 can include licenses that authorize and permit the hardware module(s) 104 to turn "on" one or more of the features 108. That is, the features 108 are normally "off" or deactivated absent the license data 110. If the license data 110 does not permit activation of a particular feature, then that feature will remain deactivated. The license data 110 can include any type of cryptographic data that can be securely distributed, obtained, and employed to activate/deactivate the features 108. For example, the license data 110 can include license "keys". Each key can be associated with one or more of the features 108. The keys can be applied as input to a cryptographic algorithm, which can determine whether the keys are valid. The management module 102 can then activate the features 108 associated with valid keys.

In an example, license(s) can be uniquely associated with the computer system 100 and/or with the hardware module(s) 104. For example, a license can be tied to a serial number or other identifier of the computer system 100 such that the license will activate associated features exclusively for the computer system 100. Likewise, a license can be tied to a particular hardware module 104 or set of hardware modules 104. Licenses uniquely associated with the computer system 100 and/or the hardware module(s) 104 will not work with other computer systems and/or hardware modules. In another example, each license(s) can be uniquely associated with particular product types of which the computer system 100 and/or the hardware module(s) 104 are included.

The firmware-based controller(s) 106 can include any type of device that controls or provides functions of the hardware module(s) 104. That is, the firmware-based controller(s) 106 include control points 112 for the hardware module(s) 104. The control points 112 can be manipulated to configure the hardware module(s) 104 with particular functionality, including the functionality that provides the features 108. Each of the firmware-based controller(s) 106 includes firmware to facilitate its function. "Firmware" includes machine-readable code and data that is stored on a memory (e.g., a non-volatile memory, hard disc memory, and the like, or a combination of such memories). In an example, the control points 112 can be accessed and manipulated using interfaces provided by the firmware of the firmware-based controller(s) 106.

The management module 102 can communicate with the firmware-based controller(s) 106 and interact with the firmware interfaces. In an example, the firmware of the firmware-based controller(s) 106 includes machine-readable code and data for cooperating with the license management provided by the management module 102. The management module 102 can configure the control points 112 to activate the features 108 as permitted by the license data 110. That is, the control points 112 normally control the features 108 "off" absent the license data 110. Based on the license data 110, the management module 102 can manipulate the control points 112 to control one or more of the features 108 "on". If the license data 110 does not permit activation of a particular feature, then the control points 112 will continue to control that feature "off".

In an example, one or more of the features 108 are controlled by a plurality of the control points 112 provided by a plurality of the firmware-based controller(s) 106. That is, control of a feature can depend on interaction with multiple firmware-based controllers 106. Moreover, the multiple firmware-based controllers that control a particular feature can be spread across different hardware modules 104. Thus, the control points for activating/deactivating a particular feature can be spread across multiple firmware-based controllers, which themselves can be spread across multiple hardware modules. The management controller 102, which can communicate with all necessary firmware-based controllers 106 to manipulate all necessary control points 112, can implement license management even for features controlled by disparate firmware-based controllers and/or hardware modules. This obviates the need to individually access the firmware of each firmware-based controller 106 in each hardware module 104 in order to activate such features.

Figure 2:
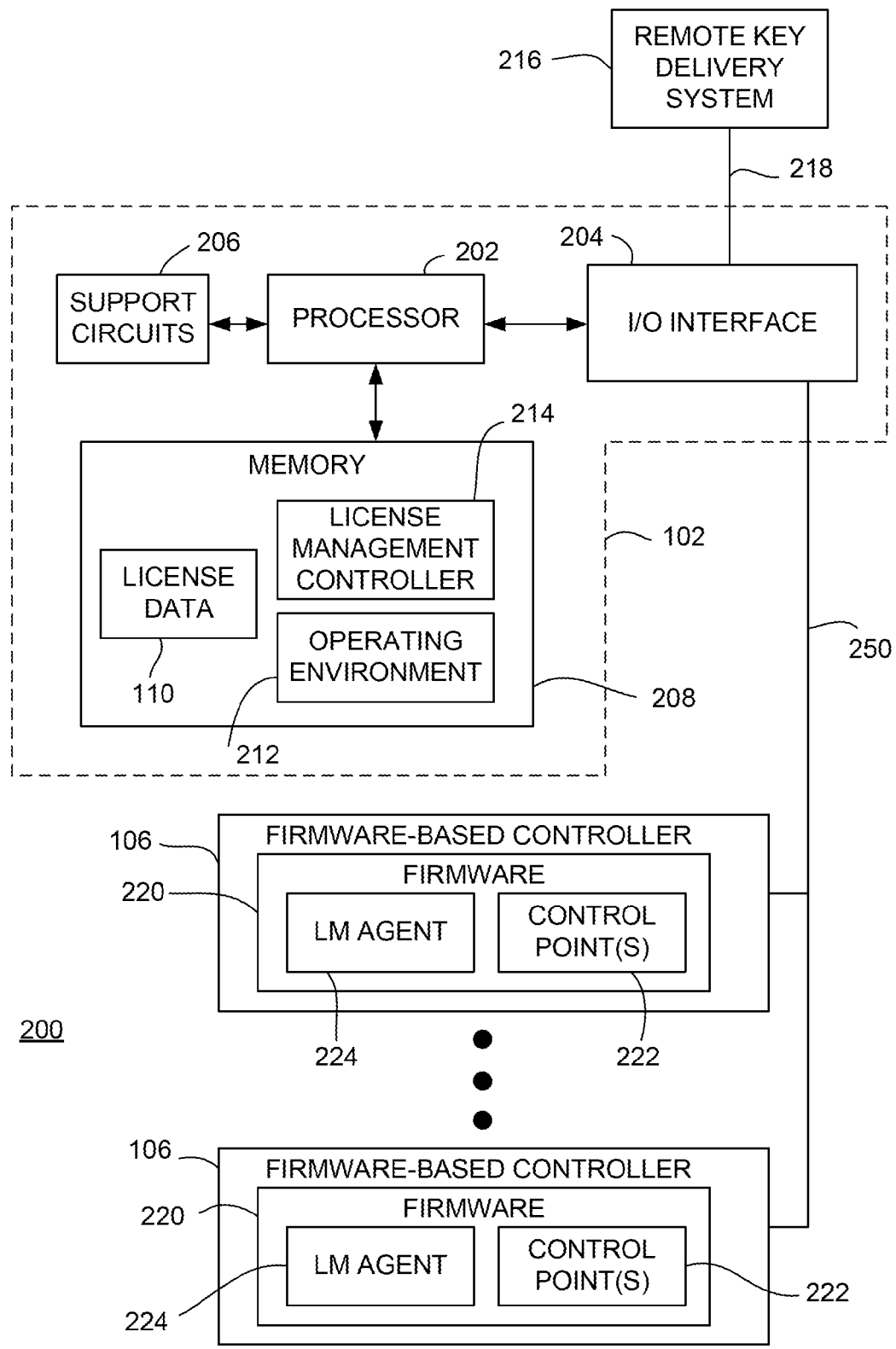
FIG. 2 is a block diagram of a portion of the computer system of FIG. 1 according to another example implementation.

FIG. 2 is a block diagram of a portion 200 of the computer system 100 according to another example implementation. Elements of FIG. 2 that are the same or similar to those of FIG. 1 are designated with identical reference numerals. In the portion 200, the management module 102 includes a processor 202, an input/output (IO) interface 204, various support circuits 206, and a memory 208. The processor 202 can include any type of microprocessor known in the art. The IO interface 204 can communicate data to and from the processor 202 and/or the memory 208. The IO interface 204 can include various interfaces, such as a network interface (e.g., Ethernet), universal serial bus (USB), I2C interface, or the like. The support circuits 206 can include cache, power supplies, clock circuits, data registers, and the like. The memory 208 can include random access memory, read only memory, cache memory, magnetic read/write memory, or the like or any combination of such memory devices. In particular, the memory 208 can include non-volatile memory, hard disc memory, and/or the like to store firmware.

The memory 208 stores machine-readable code executable by the processor 202 to provide an operating environment 212 and a license management controller 214. The operating environment 212 provides a programmable interface to the management module 102 and can provide an interface to the processor 202 for various applications, such as the license management system 214. The license management controller 214 can request and obtain the license data 110 for selectively activating features of the computer system 100. For example, the license management controller 214 can request and obtain license data 110 from a remote key delivery system 216 over a communication medium 218 through the IO interface 204. The license management controller 214 can also communicate with each of the firmware-based controller(s) 106 (a plurality of firmware-based controllers 106 are shown by example) through an interconnect 250. The interconnect 250 can include various backplanes, cables, busses, bridges, and the like to facilitate communication between the management module 102 and the firmware-based controllers 106.

Each firmware-based controller 106 includes firmware 220. The firmware 220 includes control points 222 and a license management (LM) agent 224. The control points 222 of each firmware-based controller 106 collectively provide the control points 112 shown in FIG. 1. The LM agent 224 cooperates with the license management controller 214 to manipulate the control points 222 based on the license data 110. The license management controller 214 can communicate with the LM agent 224 in each of the firmware-based controllers 106 as necessary to manipulate the appropriate control points 222 for activating the authorized features. Together, the license management controller 214 and the LM agent 224 in each of the firmware-based controllers 106 provide a license management system for the computer system 100.

Figure 3:
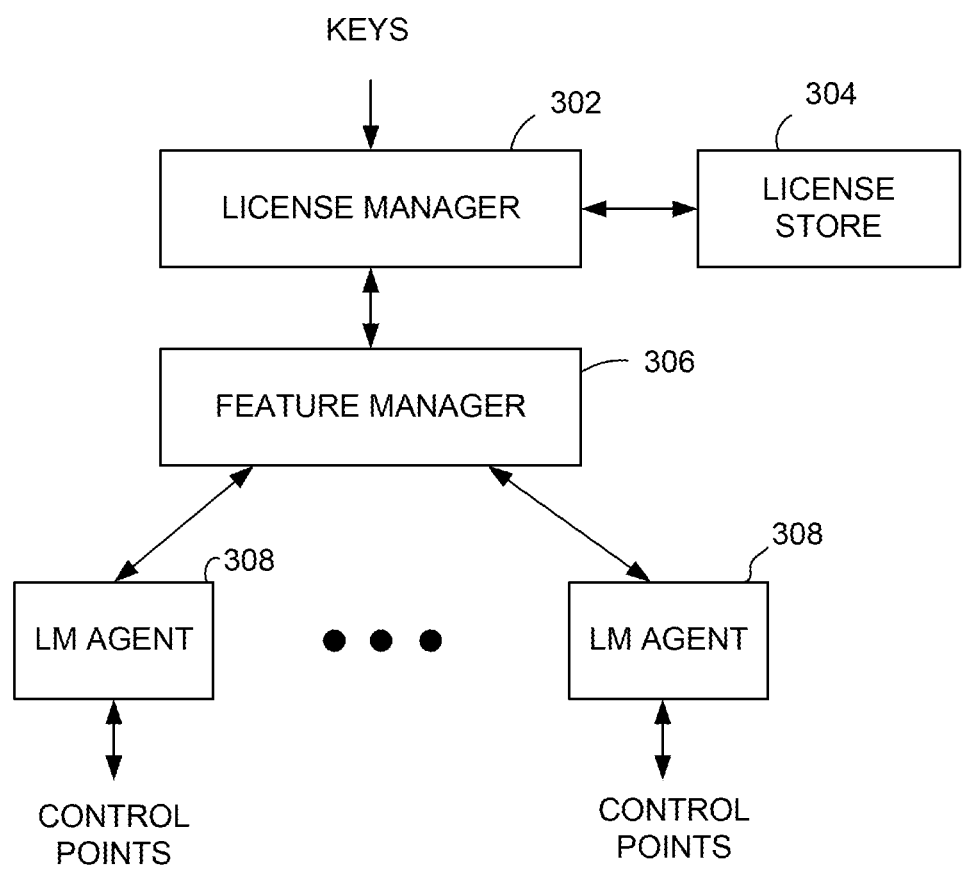
FIG. 3 is a block diagram of the license management system for a computer system according to an example implementation.

FIG. 3 is a block diagram of the license management system 300 for a computer system according to an example implementation. The license management system 300 includes a license manager 302, a license store 304, a feature manager 306, and a plurality of LM agents 308. The license manager 302 requests and obtains license data (e.g., license keys and associated authorized features) from a remote key delivery system. The license data can be stored in the license store 304. Thus, the license manager 302 can query the license store 304 to determine what features are licensed on the computer system.

The feature manager 306 is aware of the various control points on the computer system that are needed to activate or deactivate each of the features. The feature manager 306 communicates with the FA agents 308. The license manager 302 can notify the feature manager 306 of which particular features need to be activated based on the license data in the license store 304. The feature manager 306 can then determine which control points require manipulation to activate the licensed features, and communicate with the appropriate FA agents 308 on firmware-based controllers that have those control points. In this manner, the feature manager 306 controls feature enablement by signaling the appropriate FA agents 308.

Figure 4:
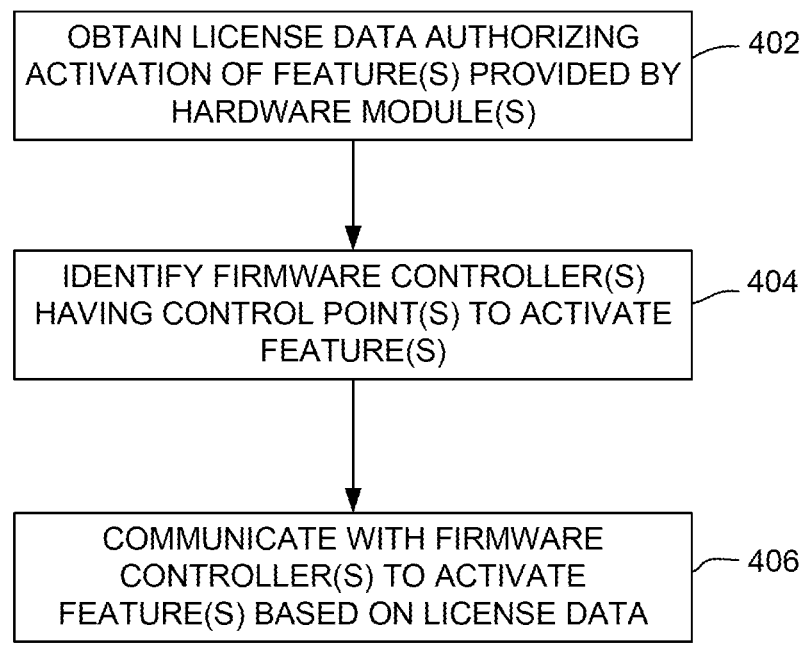
FIG. 4 is a flow diagram depicting a method of license management in a computer system according to an example implementation.

FIG. 4 is a flow diagram depicting a method 400 of license management in a computer system according to an example implementation. The method 400 begins at step 402, where a computer system obtains license data that authorizes activation of feature(s) provided by hardware module(s). At step 404, firmware-based controller(s) are identified that have control point(s) to activate the licensed feature(s). At step 406, the firmware-based controller(s) are signaled to activate the feature(s).

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc., just to name a few. Other new and various types of computer-readable media may be used to store machine readable code discussed herein.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computer system, comprising:
   a plurality of hardware modules having a plurality of features capable of selective activation, wherein each of the plurality of hardware modules is associated with a respective one of a plurality of computing devices;
   firmware-based controllers distributed among the plurality of hardware modules having control points to control activation of the plurality of features, wherein at least one feature of the plurality of features has a plurality of the control points associated therewith from a plurality of the firmware-based controllers; and
   a management module to obtain license data and communicate with the plurality of firmware-based controllers distributed among the plurality of hardware modules to configure the plurality of control points to activate the at least one feature of the plurality of features as permitted by the license data.

2. The computer system of claim 1, wherein the license data includes at least one cryptographic license key each permitting activation of at least one of the plurality of features.

3. The computer system of claim 1, wherein the management module includes an input/output interface to receive the license data from a remote key delivery system.

4. The computer system of claim 1, wherein the firmware-based controllers include license management agents and the management system includes a license management system to process the license data and communicate with the license management agents based on the license data.

5. The computer system of claim 1, wherein the license data is uniquely associated with at least one of the computer system or the plurality of hardware modules.

6. A computer system, comprising:
   a plurality of hardware modules having a plurality of features capable of selective activation, wherein each of the plurality of hardware modules is associated with a respective one of a plurality of computing devices;
   firmware-based controllers distributed among the plurality of hardware modules having control points to control activation of a plurality of features, wherein at least one feature of the plurality of features has a plurality of the control points associated therewith from a plurality of the firmware-based controllers;
   memory to store license data; and
   a processor to obtain the license data from the memory, and communicate with the plurality of firmware-based controllers distributed among the plurality of hardware modules to configure the plurality of control points to activate the at least one feature of the plurality of features as permitted by the license data.

7. The computer system of claim 6, wherein the license data includes at least one cryptographic license key each permitting activation of at least one of the plurality of features.

8. The computer system of claim 6, further comprising:
   an input/output interface to receive the license data from a remote key delivery system.

9. The computer system of claim 6, wherein the firmware-based controllers include license management agents and the processor communicates with the license management agents based on the license data.

10. A method of license management in a computer system, comprising:
    obtaining, at the computer system, license data authorizing activation of at least one feature of a plurality of features provided by a plurality of hardware modules, wherein each of the plurality of hardware modules is associated with a respective one of a plurality of computing devices, wherein the at least one feature authorized by the license data has a plurality of control points associated therewith from a plurality of the firmware-based controllers;
    identifying the plurality of firmware-based controllers distributed among the plurality of hardware modules having the plurality of control points associated therewith to activate the at least one feature;
    communicating with the plurality of firmware controllers to activate the at least one feature.

11. The method of claim 10, wherein the license data includes at least one cryptographic license key each permitting activation of the at least one feature.

12. The method of claim 10, wherein the step of obtaining includes receiving the license data from a remote key delivery system.

* * * * *